(12) United States Patent
Yang et al.

(10) Patent No.: US 10,287,402 B2
(45) Date of Patent: May 14, 2019

(54) POLYCARBONATE-POLYOLEFIN BLOCK COPOLYMERS AND METHODS OF MAKING THEM

(71) Applicants: ExxonMobil Chemical Patents Inc., Baytown, TX (US); Virginia Tech Intellectual Properties, Inc., Blacksburg, VA (US)

(72) Inventors: Yong Yang, Kingwood, TX (US); Donna S. Davis, Montgomery, TX (US); Peijun Jiang, League City, TX (US); Timothy E. Long, Blacksbury, VA (US); Sachin Bobade, Somerville, NJ (US)

(73) Assignees: ExxonMobil Chemical Patents Inc., Baytown, TX (US); Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/485,389

(22) Filed: Apr. 12, 2017

(65) Prior Publication Data
US 2017/0313825 A1 Nov. 2, 2017

Related U.S. Application Data

(63) Continuation of application No. PCT/US2017/027040, filed on Apr. 11, 2017.

(60) Provisional application No. 62/329,387, filed on Apr. 29, 2016.

(51) Int. Cl.
*C08G 64/18* (2006.01)
*C08G 64/14* (2006.01)
*C08G 81/02* (2006.01)

(52) U.S. Cl.
CPC ........... *C08G 81/027* (2013.01); *C08G 64/14* (2013.01); *C08G 64/18* (2013.01)

(58) Field of Classification Search
None
See application file for complete search history.

(56) References Cited

U.S. PATENT DOCUMENTS

| | | |
|---|---|---|
| 2,976,266 A | 3/1961 | Lytton et al. |
| 3,842,040 A | 10/1974 | Briarly et al. |
| 3,842,041 A | 10/1974 | Browne et al. |
| 4,082,731 A | 4/1978 | Knopka |
| 4,532,282 A | 7/1985 | Liu et al. |
| 4,806,599 A | 2/1989 | Priddy |
| 4,914,179 A | 4/1990 | Morris et al. |
| 4,916,205 A | 4/1990 | Morris et al. |
| 4,956,448 A | 9/1990 | Morris et al. |
| 4,959,450 A | 9/1990 | Lee et al. |
| 4,973,654 A | 11/1990 | Morris et al. |
| 5,011,877 A | 4/1991 | Morris et al. |
| 5,011,878 A | 4/1991 | Morris et al. |
| 5,037,946 A | 8/1991 | Morris et al. |
| 5,037,947 A | 8/1991 | Morris et al. |
| 5,045,610 A | 9/1991 | Bales et al. |
| 5,057,595 A | 10/1991 | Morris et al. |
| 5,081,220 A | 1/1992 | Morris et al. |
| 5,137,971 A * | 8/1992 | Dujardin ............... C08G 64/18 525/146 |
| 5,138,022 A | 8/1992 | Mang et al. |
| 5,374,707 A | 12/1994 | Asrar et al. |
| 5,416,148 A | 5/1995 | Farah et al. |
| 5,585,434 A | 12/1996 | DeNicola, Jr. et al. |
| 5,773,554 A | 6/1998 | Dickerson et al. |
| 5,786,424 A | 7/1998 | Hofmeister et al. |
| 6,288,205 B1 * | 9/2001 | Miyamoto ............ C08G 64/14 528/196 |
| 6,329,450 B1 | 12/2001 | Ogoe et al. |
| 6,352,783 B1 | 3/2002 | Fagerburg |
| 6,552,153 B1 | 4/2003 | Kaufnold et al. |
| 6,657,018 B1 | 12/2003 | Hoover |
| 7,026,027 B2 | 4/2006 | Turner et al. |
| 8,273,825 B2 | 9/2012 | Lin et al. |
| 8,507,638 B2 | 8/2013 | Crawford et al. |
| 8,586,652 B2 | 11/2013 | Williams et al. |
| 8,987,379 B2 | 3/2015 | Ahn et al. |
| 2003/0187171 A1 | 10/2003 | Lange et al. |
| 2006/0229430 A1 | 10/2006 | Turner et al. |
| 2009/0025284 A1 | 1/2009 | Lange et al. |

(Continued)

FOREIGN PATENT DOCUMENTS

| | | |
|---|---|---|
| DE | 1935252 | 1/1969 |
| JP | 57198726 | 12/1982 |

(Continued)

OTHER PUBLICATIONS

Polyakova, A. et al. Oxygen-Barrier Properties of Copolyments Based on Ethylene Terephthalate; Journal of Polymer Science: Part B: Polymer Physics, vol. 39, 1889-1899; 2001.
Turner, Sr, et al.; Chemistry and Technology of Step-Growth Polyesters, Polymer Science: A Comprehensive Reference, vol. 5, 2012.
Krigbaum, W. R. et al.; Aromatic Polyesters Forming Thermotropic Smectic Mesophases; Journal of Polymer Science: Polymer Letters Edition, vol. 20, 109-115 (1982).
PCT/US2017/027040; Jul. 17, 2017; ISR/WO.
PCT/US2017/027040 International Preliminary Report on Patentability, dated Nov. 8, 2018.

*Primary Examiner* — David J Buttner
(74) *Attorney, Agent, or Firm* — Daniel N. Lundeen; Lundeen & Lundeen PLLC

(57) ABSTRACT

A polycarbonate-polyolefin block copolymer and a process to form a polycarbonate-polyolefin block copolymer by combining mono- or di-hydroxyaryl with vinyl/vinylidene terminated polyolefin to form a polyolefin hydroxyaryl moiety, and combining the polyolefin hydroxyaryl moiety with di-hydroxyaryl and di-substituted carbonyl monomers to form a polycarbonate-polyolefin block copolymer.

20 Claims, 5 Drawing Sheets

(56) References Cited

U.S. PATENT DOCUMENTS

| | | |
|---|---|---|
| 2011/0081510 A1 | 4/2011 | Shih et al. |
| 2015/0240073 A1* | 8/2015 | Zhao .................. C08L 69/00 524/313 |
| 2016/0244559 A1 | 8/2016 | Meyer et al. |

FOREIGN PATENT DOCUMENTS

| | | |
|---|---|---|
| WO | 1990007553 | 7/1990 |
| WO | 2001000707 | 1/2001 |
| WO | 2015005201 | 1/2015 |
| WO | 2015112252 | 7/2015 |

* cited by examiner

POLYCARBONATE-POLYOLEFIN BLOCK COPOLYMERS AND METHODS OF MAKING THEM

CROSS REFERENCE TO RELATED APPLICATIONS

This is a non-provisional of, and claims the benefit of priority to, U.S. Ser. No. 62/329,387, filed Apr. 29, 2016, which is hereby incorporated by reference.

THE NAMES OF PARTIES TO A JOINT RESEARCH AGREEMENT

ExxonMobil Chemical Company, a Division of ExxonMobil Corporation, and Virginia Polytechnic Institute and State University.

FIELD OF THE INVENTION

The present invention relates to block copolymers comprising a polycarbonate block and a polyolefin block.

BACKGROUND

Bisphenol-A (2,2-bis(4-hydroxyphenyl)propane, or "BPA") polycarbonate (referred to as "polycarbonate," or "PC") is the top engineering thermoplastic by volume worldwide, and has inherently excellent thermal and mechanical properties. However, PC generally has deficiencies in areas such as poor processability, inadequate solvent and chemical resistance, and reduced toughness under low temperatures. A significant portion of commercial PC is blended with acrylonitrile-butadiene-styrene ("ABS") or polyethylene terephthalate ("PET") to improve its processability and other properties, but one or more other properties are typically compromised. The inadequate solvent and chemical resistance will cause PC to craze or crack when exposed to various common solvents or chemicals. Blending with polyolefins ("PO's") can improve chemical resistance but PC—PO blends are unstable and delamination is an issue. Typically, relatively high loadings of compatibilizers, which in many cases have a high cost, are needed for a stable morphology, but one or more properties are compromised. Some known methods of improving low-temperature performance are blending, copolymerizing, or modifying (e.g., reactive extrusion) with polysiloxane, which is relatively expensive. Publications directed to PC's include: U.S. Pat. No. 4,532,282; U.S. Pat. No. 5,416,148; U.S. Pat. No. 5,585,434; U.S. Pat. No. 5,786,424; U.S. Pat. No. 6,329,450; U.S. Pat. No. 8,987,379; US2016/0244559 (WO 2015/052110), and the like, the disclosures of which are incorporated by reference herein. There is a need in the art for polycarbonate polymers and processes to produce polycarbonates having one or more of improved processability, chemical resistance, low-temperature properties, high heat distortion temperature, high stiffness, and reduced cost relative to polycarbonate polymers and processes known in the art.

SUMMARY OF THE INVENTION

In any embodiment of the invention, a process can produce polycarbonate having balanced processability and properties. In any embodiment of the invention, the polycarbonate can comprise a polycarbonate-polyolefin block copolymer in which the polyolefin is covalently bonded to a phenyl ring of the polycarbonate polymer. Polycarbonate-polyolefin block copolymers according to any embodiment disclosed herein can have stable morphologies achieved in the absence of compatibilizers and other similar additives common in the art. The incorporated polyolefin block copolymers covalently bonded to the polycarbonate result in polycarbonates resistant to delamination, and which have improved processability, chemical resistance, low-temperature properties, and may be produced at a reduced cost. In any embodiment of the invention, the composition and structure of the polyolefin moiety covalently bonded to the polycarbonate polymer can result in high heat distortion temperature and stiffness compared to polycarbonate homopolymers known in the art.

In any embodiment of the invention, a process can comprise polymerizing a di-hydroxyaryl monomer and a di-substituted carbonyl monomer in the presence of a hydroxyaryl-polyolefin moiety to form a polycarbonate-polyolefin block copolymer; the hydroxyaryl-polyolefin moiety can be produced by contacting a hydroxyaryl compound with a vinyl and/or vinylidene terminated polyolefin having a number average molecular weight (Mn) of greater than 300 g/mole to form the hydroxyaryl-polyolefin moiety comprising the polyolefin covalently bonded to the hydroxyaryl compound; the hydroxyaryl compound having the formula:

R'—(OH)$_x$ 

wherein x is 1 or 2; and R' comprises an unsubstituted or substituted aromatic moiety having from 6 to 20 carbon atoms.

In any embodiment of the invention, a polycarbonate-polyolefin block copolymer can be according to formulae (I), (II), or a combination thereof:

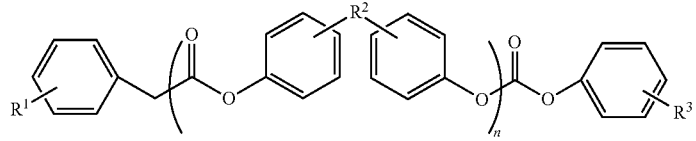

(I)

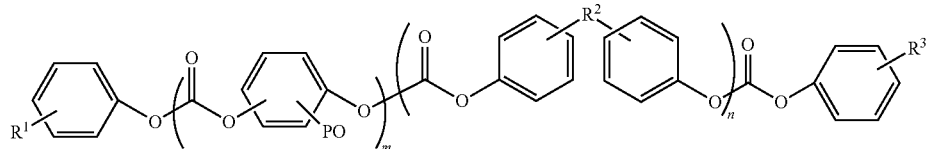

(II)

wherein each $R^1$ and $R^3$ is independently hydrogen, $C_1$-$C_{20}$ alkyl, or polyolefin ("PO"), subject to the proviso that in formula (I) at least one of $R^1$ and $R^3$ is PO;

wherein $R^2$ is a $C_1$-$C_{20}$ divalent alkyl, aryl, or alkylaryl substituent bound to each aryl ring; PO is a polyolefin substituent having a number average molecular weight (Mn) of greater than 300 g/mole, covalently bonded to the respective aryl ring; and m and n are integers independently ranging from 1 to 500.

DETAILED DESCRIPTION OF THE INVENTION

Figure 1A:
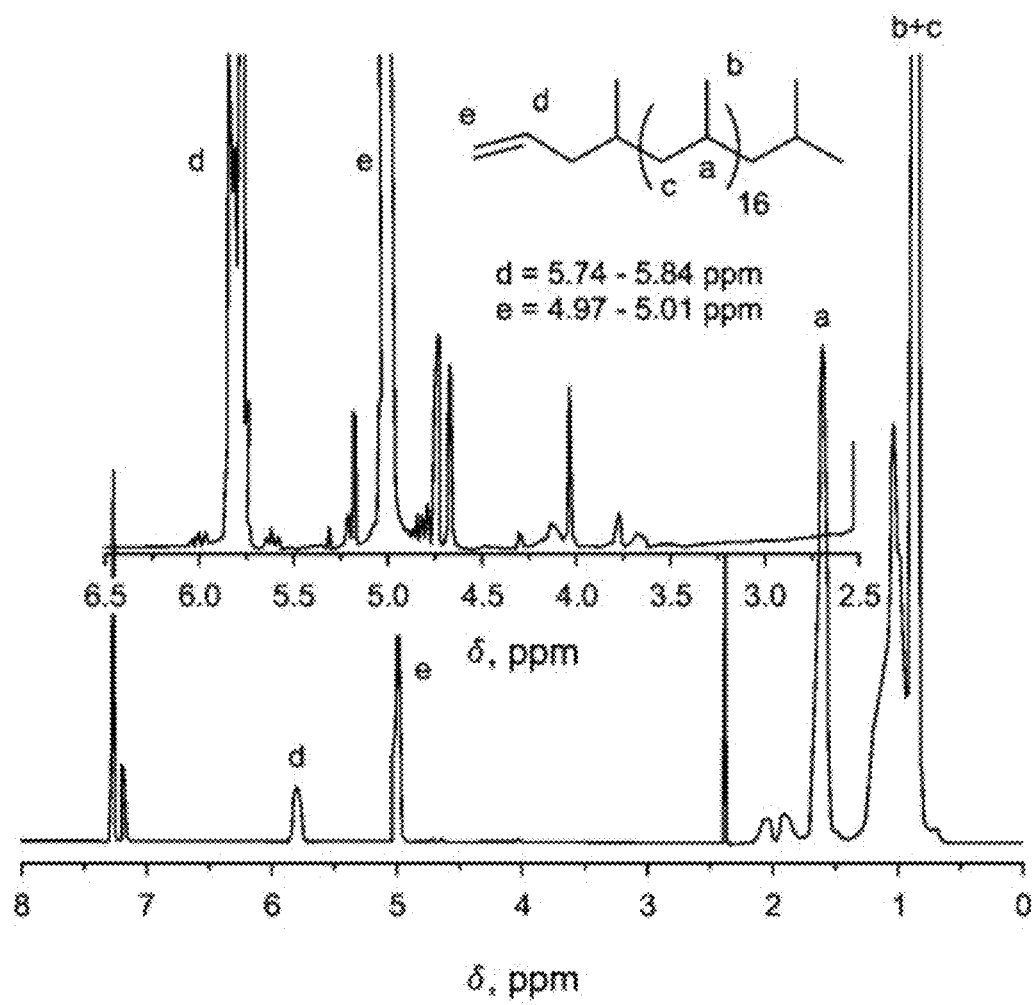
FIG. 1A is a proton NMR of the vinyl/vinylidene-terminated atactic polypropylene according to an embodiment of the invention disclosed herein.

Throughout the entire specification, including the claims, the following terms shall have the indicated meanings.

As used in the specification and claims, the term "and/or" refers to both the inclusive "and" case and the exclusive "or" case, and such term is used herein for brevity. For example, a composition comprising "A and/or B" may comprise A alone, B alone, or both A and B.

The terms "herein" or "for purposes herein" refer to this specification and the appended claims.

For purposes herein, the new numbering scheme for the Periodic Table Groups is used as in Chem. Eng. News, 1985, 63, 27. Therefore, a "Group 4 metal" is an element from Group 4 of the Periodic Table.

For purposes herein, weight average molecular weight is abbreviated Mw, number average molecular weight is abbreviated Mn, and z-average molecular weight is abbreviated Mz. Unless specified otherwise, molecular weights are listed in g/mol and, along with polydispersity, Mw/Mn, are determined by using a High Temperature Gel Permeation Chromatography equipped with three in-line detectors, a differential refractive index detector (DRI), a light scattering (LS) detector, and a viscometer, referred to as "GPC" or as "GPC-3D" as described herein.

For purposes herein, glass transition temperature is abbreviated Tg and is determined using differential scanning calorimetry (DSC) on a commercially available instrument. Complex viscosity is determined at 0.01 to 385 rad/s angular frequency at a fixed strain of 10% and 15% at 230° C. The percent vinyl termination is determined by $^1$H NMR or $^{13}$C NMR, and in case of different results, by $^1$H NMR.

For purposes herein, it is to be understood that, in the following structure:

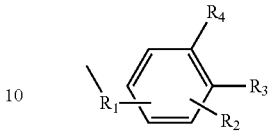

the divalent functional group $R_1$ and monovalent functional group $R_2$ may be attached to the aryl ring, in this case a benzene ring, at any one of the available carbon atoms, in this case at any one of the four available carbon atoms, whereas functional groups $R_3$ and $R_4$ are located vicinal to one another on the aryl ring. The extension of the bond into the center of the aryl ring thus indicates a chemical bond between the functional group and the aryl ring without indicating the relative spacing or arrangement between the various functional groups around the aryl ring.

For purposes herein, an "olefin," alternatively referred to as "alkene," is a linear, branched, or cyclic compound comprising carbon and hydrogen having at least one double bond. For purposes herein, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein, a "polymer" has two or more of the same or different "mer" units, each of which is commonly referred to as a "monomer." For purposes herein, monomers also include terminal mer units such as chain transfer agents, which may be a single mer unit incorporated at the end of a polymer chain. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers, tetrapolymers, and the like. A "polyolefin" or "olefin polymer" is a polymer comprising olefin derived units. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For purposes herein, RT is room temperature, which is defined as 25° C. unless otherwise specified. All percentages are weight percent (wt %) unless otherwise specified.

In any embodiment of the invention, a process can comprise polymerizing a di-hydroxyaryl monomer and a di-substituted carbonyl monomer in the presence of a hydroxyaryl-polyolefin moiety, e.g., as a mono-hydroxy chain termination agent or a dihydroxy monomeric moiety, to form a polycarbonate-polyolefin block copolymer. In any embodiment of the invention, the hydroxyaryl-polyolefin moiety can comprise the product from contacting a hydroxyaryl compound with a vinyl and/or vinylidene terminated polyolefin to form the hydroxyaryl-polyolefin moiety comprising the polyolefin covalently bonded to the hydroxyaryl compound. For example, the process can further comprise contacting the hydroxyaryl compound with the vinyl and/or vinylidene terminated polyolefin to form the hydroxyaryl-polyolefin moiety comprising the polyolefin covalently bonded to the hydroxyaryl compound. In any embodiment of the invention, the vinyl terminated polyolefin can have a number average molecular weight, Mn, of greater than 300 g/mole. In any embodiment of the invention, the hydroxyaryl compound from which the hydroxyaryl-polyolefin moiety is formed has the formula:

wherein x is 1 or 2; and R' comprises an unsubstituted or substituted aromatic moiety having from 6 to 20 carbon atoms.

Accordingly, it is to be understood that the resulting polycarbonate-polyolefin block copolymer is not a blend of two individual polymers, although the polycarbonate-polyolefin block copolymer can be used in a blend with additional polymers as described below. Instead, the polycarbonate-polyolefin block copolymer is a single entity in which the polyolefin is bonded to a monomer or chain transfer agent of the polycarbonate. In any embodiment of the invention, the hydroxyaryl compound can comprise an aryl ring according to formula I or II:

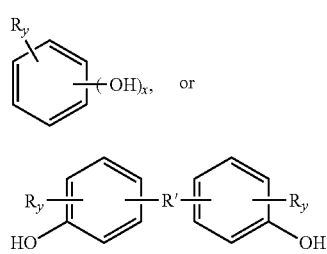

wherein each R is independently hydrogen, or a $C_1$-$C_{20}$ alkyl, aryl, or arylalkyl substitution bonded to the aryl ring in one or more positions; x is 1 or 2; y is the number of substituents necessary to render the compound electronically neutral; and wherein R' is a $C_1$-$C_{20}$ divalent alkyl, aryl, or alkylaryl substituent, bound in at least one place to each aryl ring.

In any embodiment of the invention, the hydroxyaryl compound can be phenol, 1,4-dihydroxybenzene, a $C_1$-$C_{20}$ alkyl substituted-2,2-bis(4-hydroxyphenyl), or the like, or a combination thereof. In any embodiment of the invention, the di-substituted carbonyl monomer can comprise the formula R"(CO)R", wherein each R" is independently selected from the group consisting of: hydrogen, $C_1$ to $C_{10}$ alkoxy, $C_6$ to $C_{14}$ aryloxy, $C_1$ to $C_{10}$ alkylamino, $C_6$ to $C_{14}$ arylamino, halogen, and combinations thereof.

In any embodiment of the invention, the hydroxyaryl-polyolefin moiety can comprise the product from acid catalyzed alkylation, preferably in an organic solvent at a temperature greater than or equal to about 80° C. For example, in any embodiment of the invention, the process can comprise alkylating the hydroxyaryl compound with the vinyl and/or vinylidene terminated polyolefin in the presence of an acid catalyst in an organic solvent at a temperature greater than or equal to about 80° C. In any embodiment, the process can comprise isolating the hydroxyaryl-polyolefin moiety prior to polymerization of the di-hydroxyaryl monomer and the di-substituted carbonyl monomer.

In any embodiment of the invention, the polymerization can comprise melt polymerization and/or transesterification in the presence of a polymerization catalyst, e.g., comprising a lithium halide, lithium hydroxide, lithium hydride, boron hydride, or the like, or a combination thereof. In any embodiment of the invention, the polymerization can comprise a plurality of temperature stages, each within a temperature range from about 180° C. to 300° C. and each for a period greater than or equal 30 minutes. In any embodiment of the invention, these stages can be at successively higher temperatures.

In any embodiment of the invention, the polymerization can comprise biphasic polymerization comprising a first phase comprising a salt of the di-hydroxyaryl monomer and a salt of the hydroxyaryl-polyolefin moiety, an amine catalyst, and a second phase comprising phosgene dissolved in an organic solvent.

In any embodiment of the invention, the vinyl and/or vinylidene terminated polyolefin has a number average molecular weight of less than 100,000 g/mole.

In any embodiment of the invention, a polycarbonate-polyolefin block copolymer can be according to formulae (I), (II), or a combination thereof:

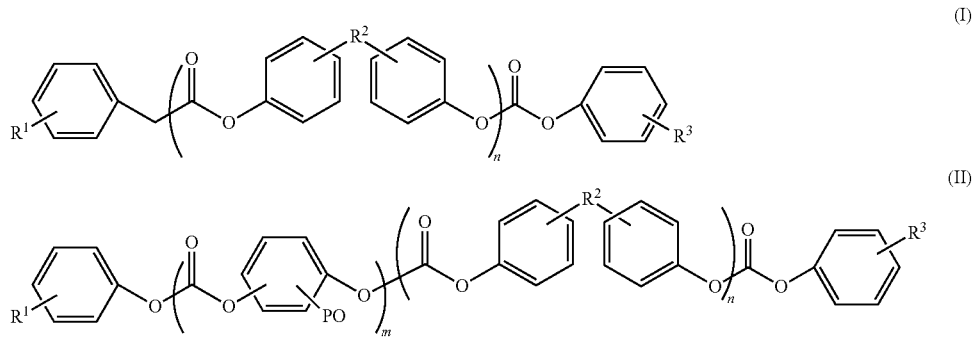

wherein:
each $R^1$ and $R^3$ is independently hydrogen, $C_1$-$C_{20}$ alkyl, or PO, subject to the proviso that in formula (I) at least one of $R^1$ and $R^3$ is PO;

$R^2$ is a $C_1$-$C_{20}$ divalent alkyl, aryl, or alkylaryl substituent, bound to each respective aryl ring;

PO is a polyolefin substituent having a number average molecular weight (Mn) of greater than 300 g/mole, covalently bonded to the respective aryl ring; and m and n are integers independently ranging from 1 to 500.

In any embodiment of the invention, at least one of $R^1$ and $R^3$ can be hydrogen, methyl, ethyl or propyl. In any embodiment of the invention, at least one of $R^1$ and $R^3$ can be methyl, subject to the proviso that in formula (I) at least one of $R^1$ and $R^3$ is PO.

In any embodiment of the invention, the polycarbonate-polyolefin block copolymer can have a branching index (g'vis) of less than 1, determined using gel permeation chromatography, and/or a glass transition temperature (Tg) within ±10% of a comparative polycarbonate polymer, and/or a complex viscosity (Pa*s) which is less than a complex viscosity of a comparative polycarbonate polymer when determined at a shear rate of 10 rad/sec or higher, wherein the comparative polycarbonate polymer is essentially identical to the polycarbonate-polyolefin block copolymer except for the presence of the hydroxyaryl-polyolefin moiety.

In any embodiment of the invention, the polyolefin substituent of the polycarbonate-polyolefin block copolymer can have a number average molecular weight of less than 100,000 g/mole. In any embodiment of the invention, each polyolefin substituent can independently comprise a homopolymer of a $C_2$-$C_{14}$ olefin (a $C_2$-$C_{14}$ homopolymer), a random copolymer of $C_2$-$C_{14}$ olefins (a $C_2$-$C_{14}$ random polyolefin), an elastomeric polyolefin of a $C_2$-$C_{14}$ olefin (an elastomeric $C_2$-$C_{14}$ polyolefin), an impact copolymer of $C_2$-$C_{14}$ olefins (a $C_2$-$C_{14}$ impact copolymer), or a block copolymer of $C_2$-$C_{14}$ olefins (a $C_2$-$C_{14}$ block copolymer). In any embodiment of the invention, each polyolefin substituent can independently comprise polyethylene, atactic polypropylene, syndiotactic polypropylene, isotactic polypropylene, ethylene-propylene copolymer, ethylene-butene copolymer, ethylene-hexene copolymer, ethylene-octene copolymer, propylene-butene copolymer, propylene-hexene copolymer, propylene-octene copolymer, or the like.

In any embodiment of the invention, a microtome of the polycarbonate-polyolefin block copolymer can have an essentially monophasic morphological image at a resolution of 200×200 nm determined using atomic force microscopy.

In any embodiment of the invention, a molded article can comprise the polycarbonate-polyolefin block copolymer according to any one or combinations of embodiments disclosed herein.

In any embodiment of the invention, the hydroxyaryl-polyolefin moiety or compound can be produced via alkylation of the hydroxyaryl compound. In any embodiment of the invention, the alkylation reaction can be catalyzed by a Lewis acid (e.g. $BF_3$) or Brønsted acid (e.g. sulfuric acid). The acid catalyst can activate the alkene to form a carbocation species, which can then react with aromatics. In particular, the alkylation reaction can comprise combining a neat or diluted vinyl/vinylidene-terminated polyolefin ("VTPO") with the phenol at a temperature of at least 80° C. or 100° C. or 120° C., or within a range from 80° C. or 100° C. to 120° C. or 130° C. or 140° C., to form heated reaction components, then combining a Brønsted acid or Lewis acid with the heated reaction components to obtain the polyolefin hydroxyaryl. Desirable acids include such acids as methanesulfonic acid ("MSA"). Other Brønsted acids that are useful include $H_2SO_4$, HCl, HBr, HI, $HNO_3$, $CH_3COOH$, $CF_3COOH$, $H_3PO_4$, $H_2S$, organic ($C_1$ to $C_{20}$) carboxylic or sulfonic acids.

Lewis acids are also useful. Categories of useful Lewis acids include those comprising $Al^{3+}$, $Cu^{2+}$, $Fe^{2+}$, $Fe^{3+}$, $Ti^{2+}$, $Sn^{2+}$, and the like, electron deficient compounds including $BF_3$, $AlF_3$, $AlCl_3$, and the like, acids having a central atom having more than 8 valence shell electrons, such as $SiBr_4$, $SiF_4$, and the like, and/or compounds having multiple bonds between two atoms of different electronegativities, such as $CO_2$, $SO_2$, and the like. In any embodiment of the invention, the alkylation reaction components can be dissolved in an organic solvent, such as, for example, dichlorobenzene, where they are contacted with one another and heated to effect the reaction between them.

In any embodiment of the invention, the conditions for melt polymerization, transesterification, or both can include the reaction of the dihydroxyaryl compound with the carbonyl compound, e.g., diphenyl carbonate ("DPC") with BPA. In any embodiment of the invention, the DPC suitable for use herein can include DPC produced via interfacial phosgenation of phenol, oxidative carbonylation of phenol, transesterification of dialkyl carbonate (e.g., dimethyl carbonate), or the like. In any embodiment of the invention, the DPC can be contacted with BPA in the presence of a catalyst under conditions sufficient to produce polycarbonate. Suitable catalysts include lithium halides, lithium hydroxide, lithium aluminum hydride, boron hydride, other polymerization additives, and the like. In any embodiment of the invention, the reaction may be carried out by reaction under a series of increasingly higher temperatures and/or lower pressures (higher vacuums). In any embodiment of the invention, sufficient reaction conditions to produce polycarbonate may include a maximum reaction temperature of about 310-320° C., a minimum pressure of about 0.5 mm Hg, or less, or a combination thereof. In any embodiment of the invention, the polycarbonate polymer can be produced by transesterification between DPC and BPA, thought to form oligomers that subsequently undergo polycondensation to produce the modified polycarbonate.

In any embodiment of the invention, the dihydroxy/carbonyl polymerization can comprise interfacial polymerization. Suitable interfacial polymerization conditions include a first phase comprising the sodium salt of the dihydroxyaryl monomer (e.g., BPA) and smaller quantities of a chain terminator, which in any embodiment may include the hydroxyaryl-polyolefin moiety. Other suitable chain terminator compounds include phenol, substituted phenols, e.g., p-tert-butylphenol, and the like, which can be dissolved into a caustic solution, e.g., 5-10% aqueous caustic solution, forming an aqueous phase. The caustic solution acts as an acid acceptor while trimethylamine is added as a catalyst. The second or other phase comprises nascent PC polymer and the di-substituted carbonyl monomer e.g., phosgene, dissolved in an organic solvent. Suitable solvents include methylene chloride or mixtures of methylene chloride with other higher-boiling solvents such as monochlorobenzene. The methylene chloride becomes a solvent for the polymer as it is formed. Polymerization is followed by polycondensation. Upon completion of the reaction and removal of the water, the polymer solution is washed. The resulting block copolymer may be isolated by various means such as evaporation, precipitation with an anti-solvent such as n-heptane or steam precipitation according to practices known in the art.

In any embodiment of the invention, the vinyl terminated polyolefin (VTPO) suitable for use herein can include polyolefins that may include vinyl-terminated polyolefins, vinylidene-terminated polyolefins, or a mixture of both vinyl- and vinylidene-terminated polyolefins, more generally referred to as polyolefins having "allylic" chain ends. In any embodiment of the invention, the VTPO's useful herein are the polymers described in U.S. Pat. No. 8,372,930 having at least one allylic-terminus (CH$_2$=CHCH$_2$-oligomer or polymer) represented by formula (IV):

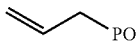

(IV)

where "PO" represents the polyolefin portion of the inventive block copolymer. In any embodiment of the invention, the allyl chain ends are represented by the formula (V):

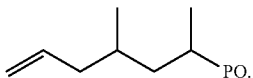

(V)

The amount of allyl chain ends is determined using $^1$H NMR at 120° C. using deuterated tetrachloroethane as the solvent on a 500 MHz machine, and in selected cases confirmed by $^{13}$C NMR, according to reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl-terminated polyolefins in Resconi et. al, 114, *J. Am. Chem. Soc.*, 1025-1032 (1992).

In any embodiment of the invention, the isobutyl chain end can be represented by one of the following formulae (VIa-d):

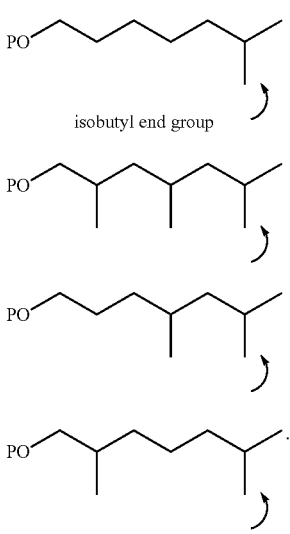

The vinyl/vinylidene-terminated propylene-based polymers may also contain an isobutyl chain end at the end opposite the allyl group. "Isobutyl chain end" is defined to be an oligomer having at least one terminus represented by the formula (VII):

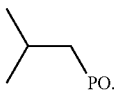

(VII)

The percentage of isobutyl end groups can be determined using 13C NMR (as described in the example section) and the chemical shift assignments in Resconi for 100% propylene oligomers. Preferably, the vinyl/vinylidene-terminated polymers described herein have an allylic terminus, and at the opposite end of the polymer an isobutyl terminus.

The VTPO's can be made by any suitable means, but most preferably the VTPO's are made in a conventional slurry or solution polymerization process using a combination of bridged metallocene catalyst compounds (especially bridged bis-indenyl or bridged 4-substituted bis-indenyl metallocenes) with a perfluorinated borate anionic activator with a bulky organic cation, such as dimethylaniliniumtetrakis-(perfluoronaphthyl) borate, or trityl-(perfluoronaphthyl) borate for example, as described in WO 2015/009474, U.S. Pat. No. 8,841,397 and U.S. Pat. No. 8,623,974.

The vinyl/vinylidene-terminated polyolefin (and the corresponding PO group) can be any polyolefin having a vinyl/vinylidene-terminal group. In any embodiment of the invention, each vinyl/vinylidene-terminal polyolefin substituent independently comprises a C$_2$-C$_{14}$ homopolymer, a C$_2$-C$_{14}$ random polyolefin, an elastomeric C$_2$-C$_{14}$ polyolefin, a C$_2$-C$_{14}$ impact copolymer, or a C$_2$-C$_{14}$ block copolymer. In any embodiment of the invention, each of the vinyl/vinylidene-terminal polyolefin substituents independently comprises polyethylene, atactic polypropylene, syndiotactic polypropylene, isotactic polypropylene, ethylene-propylene copolymer, ethylene-butene copolymer, ethylene-hexene copolymer, ethylene-octene copolymer, propylene-butene copolymer, propylene-hexene copolymer, or propylene-octene copolymer.

In any embodiment of the invention, the VTPO may be a C$_2$-C$_{14}$ homopolymer, a polyethylene homopolymer, a polypropylene homopolymer, or comprise from about 1 to 99 wt % ethylene, or from about 2 to 75 wt %, or from about 3 to 50 wt % ethylene; in any embodiment of the invention, the balance other than ethylene may be C$_3$ to C$_{14}$, or C$_3$ to C$_8$, or propylene. In any embodiment of the invention, the VTPO may comprise a C$_3$ content (propylene derived units) from about 1 to 99 wt %, or from about 2 to 75 wt %, or from about 3 to 50 wt % propylene; in any embodiment of the invention, the balance other than propylene may be ethylene or C$_4$ to C$_{14}$, or ethylene or C$_4$ to C$_8$, or ethylene. In any embodiment of the invention, the VTPO can comprise from about 3 to 50 wt % ethylene and from about 50 to 97 wt % propylene. In any embodiment of the invention, the VTPO can comprise a third comonomer selected from the group consisting of C$_4$ through C$_{14}$ units derived from C$_4$ to C$_{14}$ olefins, or α-olefins, or dienes. In any embodiment of the invention, the VTPO can comprise from about 5 to 30 wt % of this third comonomer, which in any embodiment may comprise an ethylene content from about 5 to 50 wt % and a propylene content from about 20 to 90 wt %.

In any embodiment of the invention, greater than 70, or 80, or 90, or 94, or 96 mol % of the individual VTPO molecules can comprise terminal vinyl and/or vinylidene groups; or within the range of from 50 or 60 wt % to 70, or 80, or 90, or 95, or 98 or 99 wt %.

In any embodiment of the invention, the vinyl/vinylidene-terminated polyolefin, and accordingly the PO substituent of the hydroxyaryl-polyolefin moiety, have a number average molecular weight (Mn) value of greater than 300, or 400, or 500, or 600 g/mole, or within a range from 300, or 400, or 500, or 600 g/mole and less than or equal to about 10,000, or 20,000, or 40,000, or 80,000, or 100,000 g/mole. In any embodiment of the invention, the vinyl/vinylidene-terminated polyolefins can preferably have a weight-average molecular weight (Mw) value of greater than or equal to about 500 g/mole to about 250,000 g/mole. In any embodiment of the invention, the vinyl/vinylidene-terminated polyolefins can preferably have a weight-average molecular weight (Mw) value of greater than or equal to about 500 g/mole or 1000, or 2000 g/mole, or 5000 g/mole, or 10,000 g/mole, and less than or equal to about 1000, or 2000, or 4000, or 5000, or 10,000 g/mol, depending on the lower molecular weight of the range. In any embodiment of the invention, the VTPO and by extension, the PO substituent of the hydroxyaryl-polyolefin moiety, can have an Mw from about 500, or 1000, or 2000, or 4000, or 5000, 10,000 g/mole to about 25,000, or 30,000, or 40,000, or 50,000, or 100,000, or 200,000, or 250,000 g/mole. The VTPO's useful herein can preferably have a molecular weight distribution (Mw/Mn) of less than 3.0 or 4.0 or 5.0, or within a range from 1.8, or 2.0 to 3.0, or 4.0, or 5.0.

In any embodiment of the invention, the VTPO's can be linear polymers, meaning that there is little to no polymeric or oligomeric branching from the polymer backbone, described quantitatively as having a branching index, g', of at least 0.90 or 0.96 or 0.97 or 0.98, determined as described herein.

In any embodiment of the invention, the VTPO can be a mixture comprising vinyl terminated polyolefins represented by the formula (VIII):

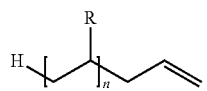

(VIII)

wherein each "R" is selected from hydrogen and $C_1$ to $C_{10}$ alkyls, or $C_1$ to $C_4$ alkyls, or methyl, or mixtures thereof; and n is an integer from 20 or 40 to 100, or 200, or 500, or 800, or 1000, or 1500, or 2000. Suitable VTPO's can then be reacted under suitable conditions, e.g., under suitable alkylation conditions, with a substituted or unsubstituted phenol or another mono-hydroxyaryl compound and/or a di-hydroxyaryl compound, and/or a tri-hydroxyaryl compound, to create the polyolefin hydroxyaryl moiety.

The various descriptive elements and numerical ranges disclosed herein for the block copolymers and methods of forming such can be combined with other descriptive elements and numerical ranges to describe the block copolymers and desirable compositions including such; further, for a given element, any upper numerical limit can be combined with any lower numerical limit described herein, including the examples in jurisdictions that allow such combinations.

In any embodiment of the invention, the polycarbonate-polyolefin block copolymer can have a number average molecular weight (Mn) from about 5000 g/mole to 1,000,000 g/mole. In any embodiment of the invention, the polycarbonate-polyolefin block copolymer can have a number average molecular weight greater than or equal to about 7000 g/mol, or greater than or equal to about 10,000 g/mol, or greater than or equal to about 15,000 g/mol, or greater than or equal to about 20,000 g/mol, or greater than or equal to about 50,000 g/mol, or greater than or equal to about 60,000 g/mol, or greater than or equal to about 100,000 g/mol, or greater than or equal to about 500,000 g/mol and less than or equal to about 500,000 g/mol, or less than or equal to about 100,000 g/mol, or less than or equal to about 60,000 g/mol, or less than or equal to about 30,000 g/mol, or less than or equal to about 15,000 g/mol, or less than or equal to about 10,000 g/mol, depending on the lower molecular weight of the block copolymer. In any embodiment of the invention, the polycarbonate-polyolefin block copolymer can have a z-average molecular weight (Mz) from about 5000 or 10,000, or 20,000 g/mole, to about 1,000,000, or 500,000, or 120,000 g/mole.

Blends

In any embodiment of the invention, the inventive polycarbonate-polyolefin block copolymer according to embodiments disclosed herein can be combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene and/or butene and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In any embodiment of the invention, the polycarbonate-polyolefin block copolymer can be present in the above blends, at from 10 to 99 wt %, based upon the weight of the polymers in the blend, or from 20 to 95 wt %, or from 30 to 90 wt %, or from 40 to 90 wt %, or from 50 to 90 wt %, or from 60 to 90 wt %, or at from 70 to 90 wt %.

The inventive blends described above may be produced by mixing the polycarbonate-polyolefin block copolymer with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The inventive blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blends, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Molded Products

The polycarbonate-polyolefin block copolymer compositions described herein may be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the inventive polycarbonate-polyolefin block copolymer compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 µm to 2540 µm (10 mils to 100 mils), although any given sheet may be substantially thicker.

EXAMPLES

Complex Viscosity

Dynamic shear melt rheological data (such as in FIG. 2) was measured with an Advanced Rheometrics Expansion System (ARES) using parallel plates (diameter=25 mm) in a dynamic mode under nitrogen atmosphere. For all experiments, the rheometer was thermally stable at 230° C. for at least 30 minutes before inserting a compression-molded sample of resin onto the parallel plates. The samples viscoelastic behavior was determined using frequency sweeps in the range from 0.01 to 385 rad/s were carried out at 230° C. under constant strain. Depending on the molecular weight and temperature, strains of 10% and 15% were used and linearity of the response was verified. A nitrogen stream was circulated through the sample oven to minimize chain extension or cross-linking during the experiments. A sinusoidal shear strain was applied to the material. If the strain amplitude was sufficiently small the material behaves linearly.

It can be shown that the resulting steady-state stress will also oscillate sinusoidally at the same frequency but will be shifted by a phase angle δ (delta) with respect to the strain wave. The stress leads the strain by δ. For purely elastic materials δ=0°, i.e., stress was in phase with strain, and for purely viscous materials, δ=90°, i.e., stress leads the strain by 90° although the stress was in phase with the strain rate. For viscoelastic materials, 0<δ<90. The shear thinning slope, "STS", was measured using plots of the base ten logarithm of the dynamic viscosity versus the base ten logarithm of the frequency. The slope was the difference in the log(dynamic viscosity) at a frequency of 100 s-1 and the log(dynamic viscosity) at a frequency of 0.01 s-1 divided by 4.

The complex shear viscosity (eta, or η*) versus frequency (omega, or ω) curves were fitted using the Cross model (cf. C. W. Macosco, RHEOLOGY: PRINCIPLES, MEASUREMENTS, AND APPLICATIONS, Wiley-VCH, 1994):

$$\eta^* = \frac{\eta_0}{1+(\lambda\omega)^{1-n}}.$$

The three parameters in this model are: η0 is the zero-shear viscosity; λ (lambda), the average relaxation time; and n, the power-law exponent. The zero-shear viscosity was the value at a plateau in the Newtonian region of the flow curve at a low frequency, where the dynamic viscosity was independent of frequency. The average relaxation time corresponds to the inverse of the frequency at which shear-thinning starts. The power-law exponent describes the extent of shear-thinning, in that the magnitude of the slope of the flow curve at high frequencies approaches 1−n on a log (η*)−log(ω) plot. For Newtonian fluids, n=1 and the dynamic complex viscosity was independent of frequency. For the polymers of interest here, n<1, so that enhanced shear-thinning behavior was indicated by a decrease in n (increase in 1−n).

Molecular Weights and Branching

Mw, Mn and Mw/Mn were determined by using a high temperature gel permeation chromatography, "GPC-3D" employed on an Agilent PL-220® system equipped with three in-line detectors: a differential refractive index detector (DRI), a light scattering (LS) detector, and a viscometer. Experimental details, including detector calibration, are described in Sun et al., in 34(19) Macromolecules 6812-6820, (2001) and references therein. Three Agilent® PLgel 10 m Mixed-B LS columns were used. The nominal flow rate was 0.5 mL/min, and the nominal injection volume was 300 µL. The various transfer lines, columns, viscometer and differential refractometer (the DRI detector) were contained in an oven maintained at 145° C.

Solvent for the experiment were prepared by dissolving 6 grams of butylated hydroxytoluene as an antioxidant in 4 liters of Aldrich® reagent grade 1,2,4-trichlorobenzene (TCB). The TCB mixture was then filtered through a 0.1 µm Teflon® filter. The TCB was then degassed with an online degasser before entering the GPC-3D. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at room temperature and 1.284 g/ml at 145° C. The injection concentration was from 0.5 to 2.0 mg/ml, with lower concentrations being used for higher molecular weight samples. Prior to running each sample the DRI detector and the viscometer were purged. Flow rate in the apparatus was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, IDRI, using the following equation:

$$c = (KDRI) * (IDRI)/(dn/dc),$$

where KDRI was a constant determined by calibrating the DRI, and (dn/dc) was the refractive index increment for the system. The refractive index, n=1.500 for TCB at 145° C. and λ=690 nm. Units on parameters throughout this description of the GPC-3D method were such that concentration is expressed in g/cm3, molecular weight is expressed in g/mole, and intrinsic viscosity is expressed in dL/g.

The LS detector was a Wyatt Technology High Temperature Dawn Heleos™ II. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c,$$

where $\Delta R(\theta)$ was the measured excess Rayleigh scattering intensity at scattering angle θ, c was the polymer concentration determined from the DRI analysis, A2 was the second virial coefficient. P(θ) was the form factor for a monodisperse random coil, and $K_o$ was the optical constant for the system:

$$K_o = \frac{4\pi^2 n^2 (dn/dc)^2}{\lambda^4 N_A}$$

where NA was Avogadro's number, and (dn/dc) was the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, ηs, for the solution flowing through the viscometer was calculated from their outputs. The intrinsic viscosity, [η], at each point in the chromatogram was calculated from the following equation:

$$\eta s = c[\eta] + 0.3 (c[\eta])2,$$

where c was concentration and was determined from the DRI output.

The branching index (g'vis) was calculated using the output of the GPC-DRI-LS-VIS method as follows. The average intrinsic viscosity, [η]avg, of the sample was calculated by:

$$[\eta]_{avg} = \frac{\sum c_j [\eta]_j}{\sum c_i},$$

where the summations are over the chromatographic slices, i, between the integration limits. The branching index g'vis was defined as:

$$g'vis = \frac{[\eta]_{avg}}{kM_v^\alpha},$$

where the k and α were the Mark-Houwink parameters and Mv was the viscosity-average molecular weight based on molecular weights determined by LS analysis. The z-average branching index (g'$Z_{ave}$) can be calculated using $C_i$=polymer concentration in the slice i in the polymer peak times the mass of the slice squared, $M_i^2$.

All molecular weights were weight average unless otherwise noted. All molecular weights are reported in g/mol unless otherwise noted. For most aliphatic polyolefins such as PE and PP, the Mark-Houwink parameters, dn/dc (specific refractive increment at chemical equilibrium) and A2 (second virial coefficient), can be found in the literature (Sun et al., in 34(19) Macromolecules, 6812-6820, (2001)). For a new polymer, the above parameters should be determined separately. The procedure is shown below.

If the polymer was completely soluble, the dn/dc value can be calculated from its mass recovery by comparing with a reference material (PE or PS) as shown in the below equation:

$$\frac{dn}{dc} = \frac{MR}{MR_{ref}} \left(\frac{dn}{dc}\right)_{ref}.$$

where "MR" was mass recovery. The Mark-Houwink parameters k and α can be obtained by fitting the linear part of [η] vs. MLS data. The A2 was simply assumed to be the same as the reference material because it does not influence the MW calculation much at very dilute concentration. For PC material, the parameters were found to be as following: K=0.00047961, α=0.65422, dn/dc=0.053, A2=0.0004.

Dynamic Mechanical Thermal Analysis ("DMTA")

A Rheometrics Solids Analyzer ("RSA3") was used for the hysteresis measurements (such as in FIG. 2), and the permanent set was calculated from that under ASTM D412. The RSA3 imposes a tensile elongation on a polymer sample to determine the tensile strength of a sample. The hysteresis measurement gauges the stress on a sample as the rheometer imposes a specified elongation and immediate retraction of the polymer sample. The hysteresis of the sample under stress was done under elongation over two full cycles. The elongation measurement stretches a sample at a constant elongation rate (typically 0.333 mm/sec) until the sample breaks. The resulting stress under this deformation was measured and the stress at fracture determines the yield stress.

Samples were prepared as small dumb-bell shaped samples, the whole sample approximately 25.0 mm long by 13 mm wide by 0.5 mm thick polymer samples (wherein the middle of the dumb-bell was 2 mm wide by 5 mm long, connecting the two large ends that were 13 mm wide and 9 mm long). Samples were molded at approximately 190° C. on either a Carver Lab Press or Wabash Press. If no stabilizer or antioxidant was already present in the polymer sample, about 0.1 wt % of butylated hydroxytoluene ("BHT") was added to the sample.

The polymer samples were loaded into the open oven of the RSA3 between tool clamps on both ends. The length of sample was recorded once sample was stabilized at the testing temperature. After the oven and sample has reached testing temperature of 25° C., the test was begun.

Calibration and quality control for the RSA3 measurements were conducted by performing a dynamic temperature ramp at 6.28 rad/s (1 Hz) from −100° C. to 40° C. at 0.05% strain on a standard sample of ExxonMobil Exact™ 4049 plastomer. The temperature corresponding to the local maximum of the tan delta curve was −40.5° C., and the tan delta was 0.3478

Atomic Force Microscopy

Atomic Force Microscopy ("AFM") was a morphological imaging technique here that was carried out using an Asylum Research Cypher Atomic Force Microscope. Samples were cryo-microtomed prior to scanning in order to create a smooth surface at −120° C. After microtoming, the samples were purged under $N_2$ in a desiccator before AFM evaluation. Imaging was conducted according to the following. The instrument was tuned to the fundamental (1st) mode of the cantilever, setting the amplitude at 1.0 V and the drive frequency to about 5% below the free-air resonance frequency of the cantilever. If running in multifrequency mode, tune the selected higher mode (2nd, 3rd, or 4th, depending on cantilever and holder), setting the amplitude to 100 mV and the drive frequency on resonance. The setpoint was set to 640 mV, the scan rate to 1 Hz, and the scan angle to 90°.

The Asylum Research reference standard (10 microns×10 microns pitch grating×200 nm deep pits) was used for the AFM statistical quality control (SQC) and X, Y, and Z calibration. The instrument was calibrated to be accurate within 2% or better of true value for X-Y and within 5% or better for Z. Representative scan sizes were 10×10 µm, 5×5 µm, 1×1 µm and 500×500 nm.

Nuclear Magnetic Resonance

Proton NMR spectra were collected using a 500 MHz Varian pulsed Fourier transform NMR spectrometer equipped with a variable temperature proton detection probe operating at 120° C. The polymer sample was dissolved in 1,1,2,2-tetrachloroethane-d2 ("TCE-d2") and transferred into a 5 mm glass NMR tube. Typical acquisition parameters were sweep width of 10 KHz, pulse width of 30 degrees, acquisition time of 2 seconds, acquisition delay of 5 seconds and number of scans was 120. Chemical shifts were determined relative to the TCE-d2 signal which was set to 5.98 ppm.

Example 1: Alkylation of Phenol with Vinyl-Terminated Polypropylenes

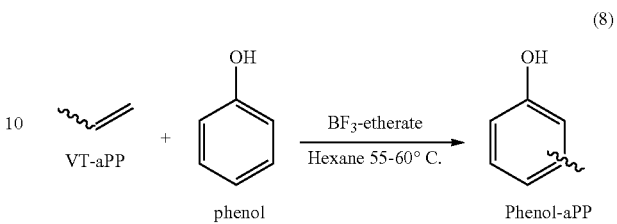

(8)

Vinyl-terminated atactic polypropylene (VT-aPP) was synthesized using organometallic coordinated polymerization as described generally in the scheme (8) above.

Alkylation of phenol was carried out with VT-aPP using $BF_3$-etherate catalysis. In the general scheme (8), the "〰〰〰" symbol represents the aPP polymeric chain. For alkylation with VT-aPP, reactions were conducted either in hexane or cyclohexane at 55-70° C., whereas alkylation of VT-iPP would be carried out in toluene at 110-120° C. Depending on the molecular weights of VT-aPP, molar ratios of phenol:VT-aPP were varied from 10 to 100 for 800 g/mol VT-aPP to 6100 g/mol VT-aPP, respectively. Amounts of catalyst $BF_3$-etherate were varied from 5-20 mol % based on phenol.

A three-neck round bottom flask equipped with a condenser, dropping funnel, and rubber septum was used for the alkylation of phenol with VT-aPP. Under nitrogen blanket, a VT-aPP solution in hexane/cyclohexane (about 20-30 wt %) was charged in the addition funnel. Phenol was charged into the RBF and dissolved in hexane/cyclohexane at 55-60° C. After homogeneous solution of phenol was obtained, BF3-etherate was added by syringe to the reaction mixture, followed by dropwise addition of the VT-aPP solution over a period of 1-2 h. After complete addition of VT-aPP solution, the resulting reaction mixture was further stirred at 55-60° C. for 24 h. After complete disappearance of chain-end vinyl groups (monitored by 1H NMR), reaction was stopped. The solution was cooled to room temperature and washed with either hot water or acetonitrile to remove catalyst and excess phenol. Washing was repeated until TLC analysis indicated no more residual phenol. The solution was then dried over magnesium sulfate, filtered, and the solvent was evaporated to give the desired phenol-terminated aPP (phenol-aPP) with 85-95% yield.

In a modified procedure, instead of dropwise addition of VT-aPP, both phenol and VT-aPP were added to a two-neck RBF. After dissolution of phenol and VT-aPP, BF3-etherate was added to the solution at 55-60° C. and the reaction mixture was stirred for 24 h. Recovery of phenol-aPP was carried out in a similar fashion as described above.

Figure 1B:
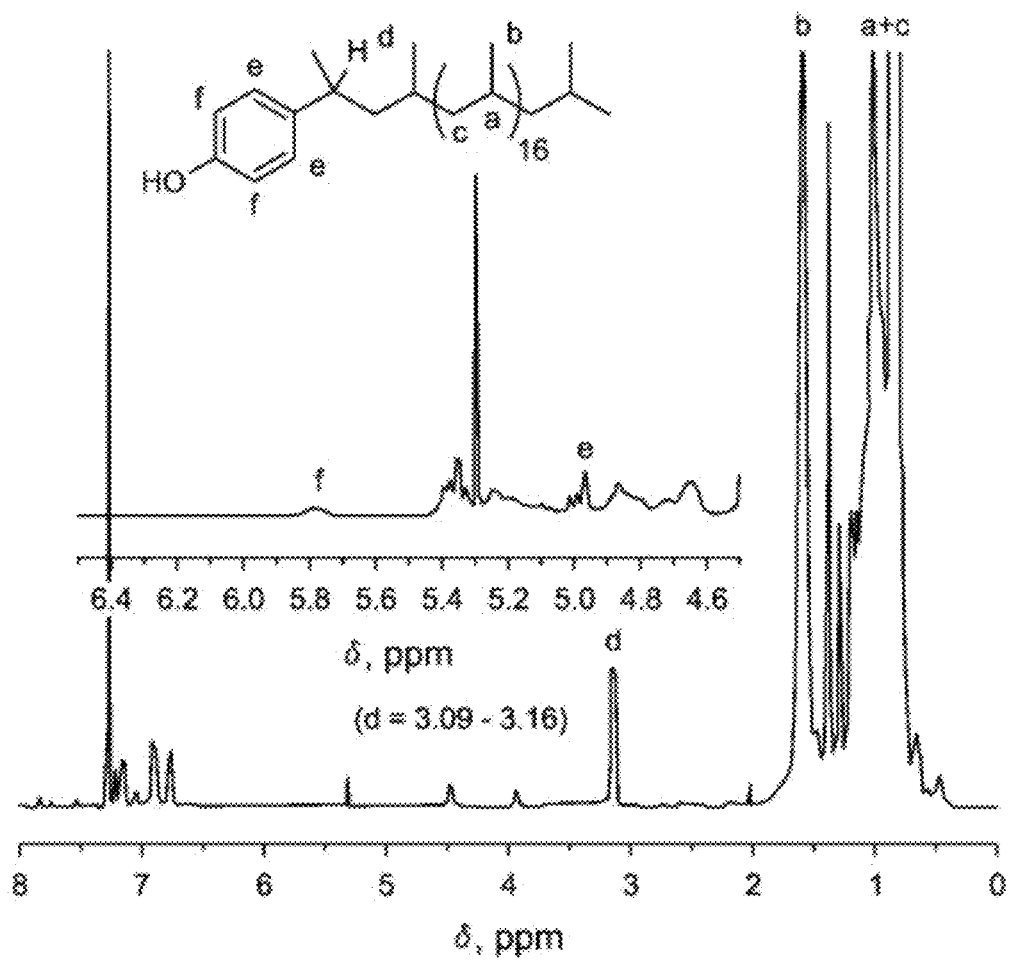
FIG. 1B is a proton NMR of the atactic polypropylene-phenol compound according to an embodiment of the invention disclosed herein.

The products were characterized by NMR and GPC. As shown in FIG. 1a, the starting material VT-aPP has signature vinyl proton peaks at 5.0 and 5.8 ppm. The vinyl peaks disappeared after the alkylation reaction and new aromatic peaks in the region of 6.5 to 7.5 ppm appeared (FIG. 1b), indicating complete conversion of VT-aPP to phenol-aPP. The number-averaged molecular weight (Mn) slightly increased from 6146 g/mole to 6265 g/mole as determined by GPC described above, indicating no side reactions such as oligomerization and/or multiple alkylation.

The mono-functional phenol-aPP was used subsequently as the comonomer for the synthesis of PC—PO block copolymers.

Example 2: Synthesis of Phenylethylhydroquinone-Terminated Atactic Polypropylene (PhEtHQ-aPP)

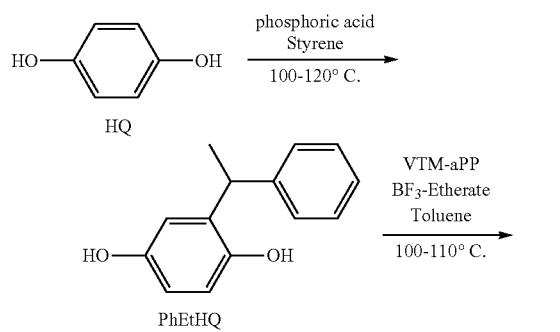

(9)

Attempts to directly alkylate hydroquinone ("HQ") with VTPO failed, therefore a two-step alkylation was carried out, described generally in scheme (9), where, again, the "⁓⁓⁓⁓⁓" symbol represents the aPP polymeric chain.

Phenylethylhydroquinone (PhEtHQ) was synthesized by alkylation of HQ with styrene using phosphoric acid as the catalyst. In a typical reaction, to a three-neck RBF equipped with a condenser and dropping funnel was charged with 1 mol HQ, followed by 3.5 mol phosphoric acid (75% in water), and 250 mL toluene. Styrene (0.95 mol) in 250 mL toluene solution was charged in the dropping funnel. The styrene solution was added dropwise to the heterogeneous mixture of HQ/phosphoric acid at 100-110° C. Addition was completed within 3-4 h and the reaction mixture was kept under vigorous stirring overnight. The next day, the hot reaction mixture was transferred to a separatory funnel. The upper layer of toluene solution containing PhEtHQ product was separated and stirred over sodium sulfate, filtered and evaporated to remove toluene, furnishing a yellowish glassy-syrupy liquid with 95% yield.

PhEtHQ-aPP was synthesized by alkylation of the PhEtHQ from the first step with VT-aPP. The alkylation procedure was carried out in toluene at 100-110° C. in a similar fashion. At the conclusion of reaction, the toluene solvent was removed over a rotatory evaporator and the concentrated reaction mixture was dissolved in hexane. The excess PhEtHQ was extracted with acetonitrile or dimethylformamide and the hexane solvent was removed over a rotatory evaporator to give the PhEtHQ-aPP product. The difunctional PhEtHQ-aPP was used subsequently as the comonomer for the synthesis of PC—PO block copolymers.

Example 3: General Procedure for Synthesis of PC Homopolymers and PC—PO Block Copolymers

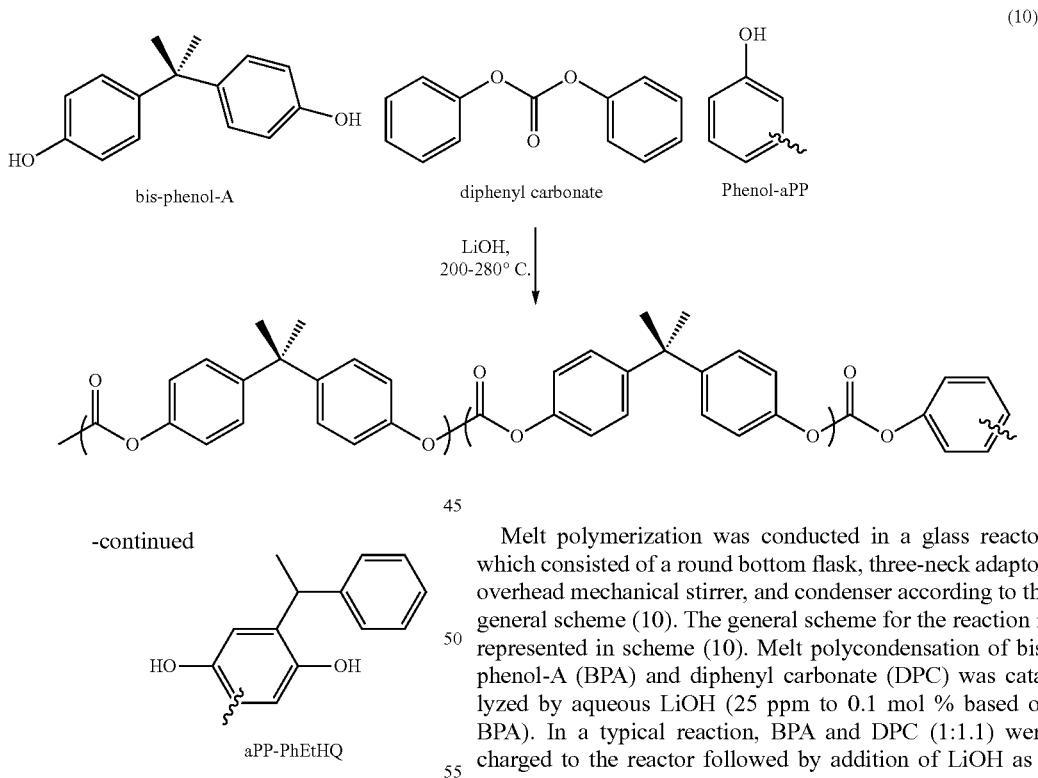

(10)

Melt polymerization was conducted in a glass reactor, which consisted of a round bottom flask, three-neck adaptor, overhead mechanical stirrer, and condenser according to the general scheme (10). The general scheme for the reaction is represented in scheme (10). Melt polycondensation of bisphenol-A (BPA) and diphenyl carbonate (DPC) was catalyzed by aqueous LiOH (25 ppm to 0.1 mol % based on BPA). In a typical reaction, BPA and DPC (1:1.1) were charged to the reactor followed by addition of LiOH as a catalyst. After evacuation for 10-15 minutes, the reactor was kept under continuous nitrogen purge and immersed in a molten alloy bath at 200° C. The reaction mixture was stirred with a mechanical stirrer at 100 rpm for 30-45 min. Then vacuum was applied slowly for about 15 min to remove the by-product phenol. After a significant amount of phenol distillation ceased, the temperature was ramped from 200 to 260° C. over a period of 30-60 min to remove excess DPC and phenol. The reaction was further carried out for 30-45 min each at 260, 270, and 280° C. The overall reaction time ranged from 3.3 to 4.3 h. The PC—PO block copolymer was synthesized by using mono-functional phenol-aPP as the chain stopper. When the phenol-aPP was used, the feeding ratio was adjusted accordingly to maintain the (BPA+phenol-aPP):(DPC) ratio as 1:1.1. The polymerization was stopped by removing the reactor from the molten bath. The reaction mixture was cooled to room temperature and dissolved in dichloromethane. PC homopolymers were obtained by precipitation to methanol, whereas PC—PO block copolymers were obtained by precipitation to hexane. The polymer products were filtered and dried in vacuum oven at 60-70° C. for 24 h or until it obtained constant weight.

The products were characterized by NMR and GPC, the GPC results being summarized in Table 1. The 1H NMR spectrum of the PC-aPP block copolymer product shows signature peaks from both the PC block and aPP blocks. Compared to PC homopolymer, which is a linear polymer as indicated by a g' value of about 1, the PC—PO block copolymer has a reduced g' value of 0.8 to 0.9, indicating the formation of block copolymer because at the same molecular weight the PC—PO block copolymer has lower viscosity than the PC homopolymer due to the low-viscosity PO block. Moreover, the GPC trace of PC—PO block copolymer is unimodal, ruling out the possibility of physical blend of PC and PO homopolymers.

TABLE 1

GPC Characteristics of VT-aPP and the PC-PO Block copolymer

| Polymer | Mn (g/mole) | Mw (g/mole) | Mz (g/mole) | Mw/Mn | Mz/Mw | g' |
|---|---|---|---|---|---|---|
| VT-aPP | 6655 | 22,300 | 38,402 | 3.4 | 1.7 | 0.99 |
| PC-aPP | 13,979 | 34,290 | 60,259 | 2.4 | 1.8 | 0.90 |

Figure 2:
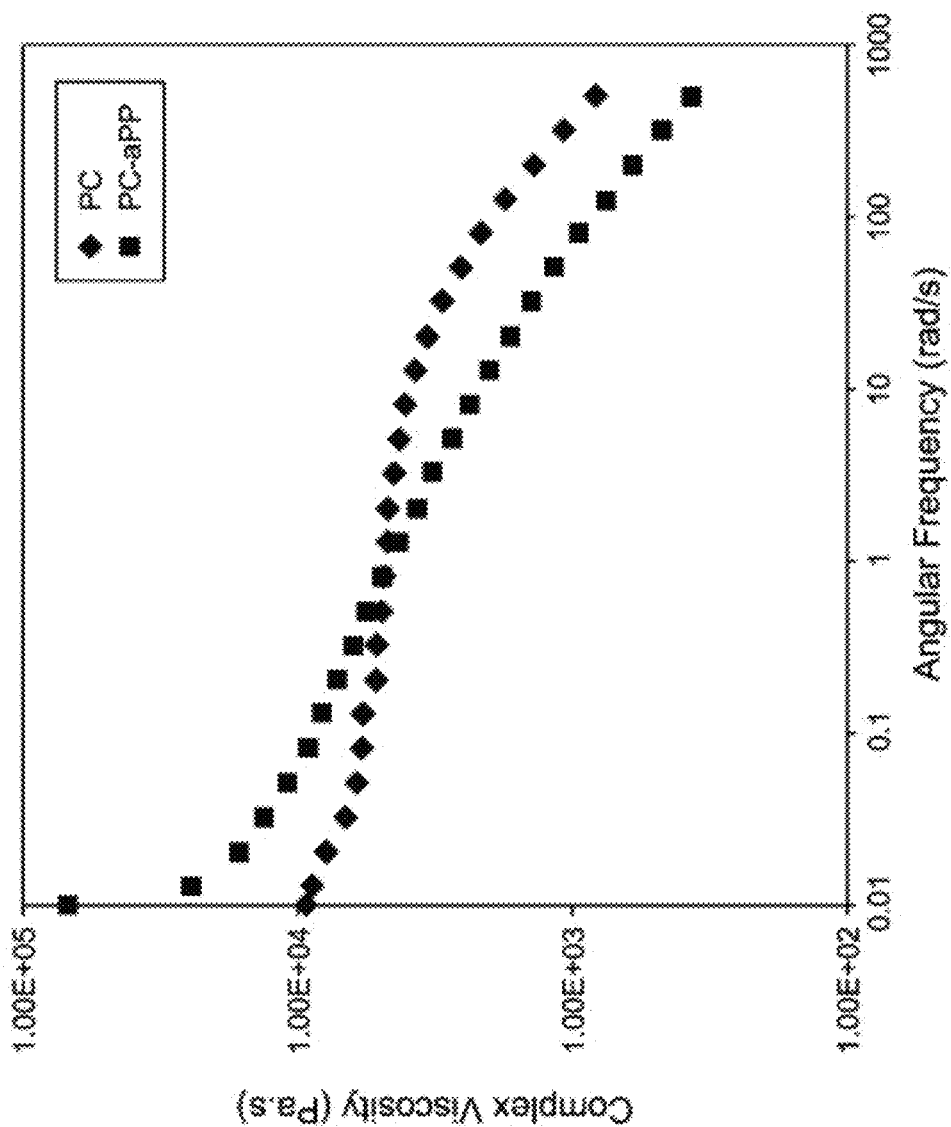
FIG. 2 shows overlay curves of the complex viscosity as a function of the angular frequency of a comparative polycarbonate and a polycarbonate-polyolefin block copolymer according to an embodiment of the invention disclosed herein.

Rheological/Thermal/Mechanical Analysis of PC Homopolymer and PC—PO Block Copolymer Complex viscosities of PC homopolymer and PC—PO block copolymer were measured in a wide range of shear rates (FIG. 2). The PC—PO block copolymer (red) demonstrated more pronounced shear-thinning than the PC homopolymer (blue). At the high shear rates (injection molding rates), the viscosities were reduced, indicating better flowability and processability.

Figure 3:
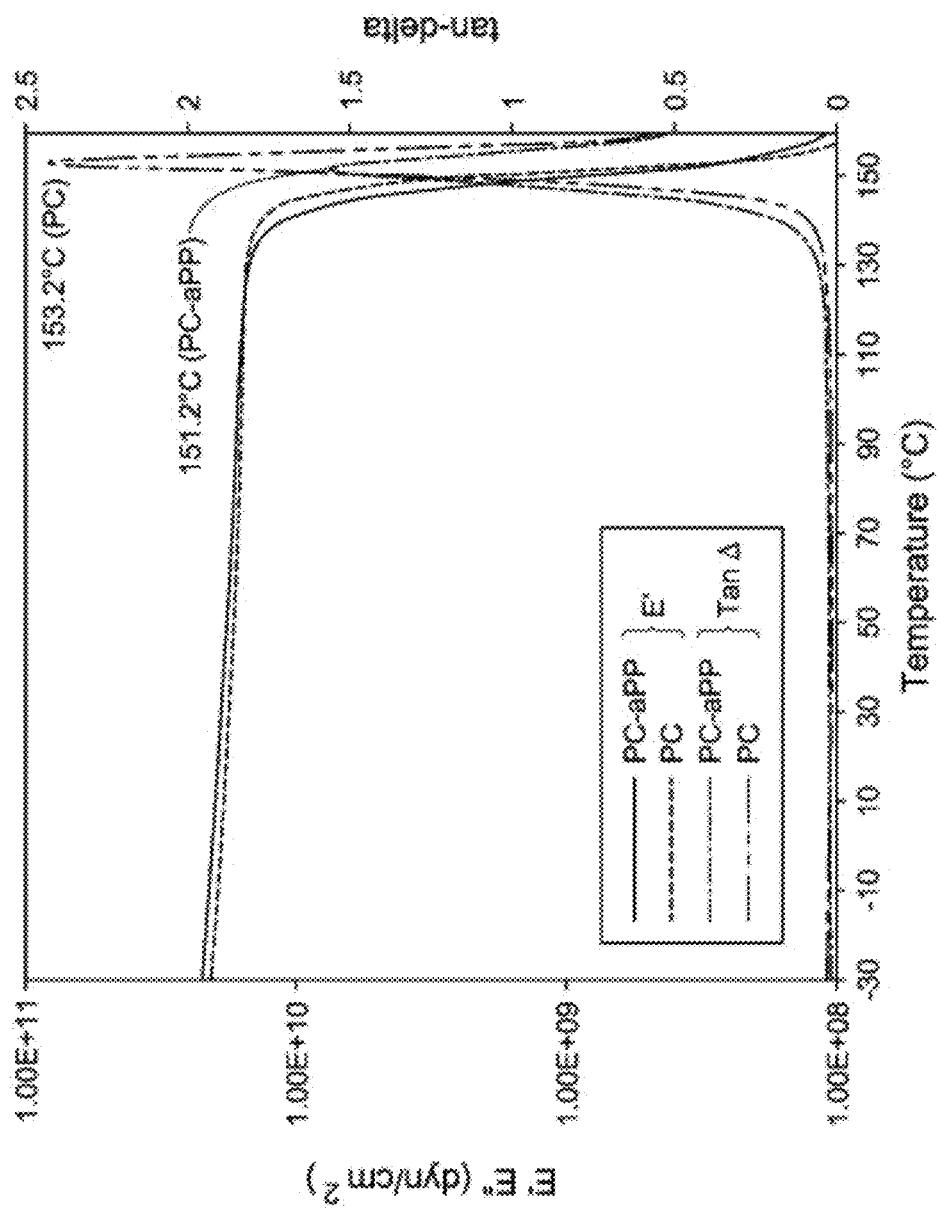
FIG. 3 shows overlay curves of tan A and storage modulus (E') as a function of temperature of a comparative polycarbonate and a polycarbonate-polyolefin block copolymer according to an embodiment of the invention disclosed herein.

Dynamic mechanical thermal analysis over a wide temperature range was performed on the PC homopolymer and PC—PO block copolymer (FIG. 3). By covalently incorporating a low-Tg and low-modulus PO component, the overall Tg and modulus of the PC—PO block copolymer were retained. The moduli of homopolymer and block copolymer at 120° C. and below were nearly identical, indicating under broad use temperatures, the high stiffness of PC was not compromised by incorporation of a PO component. The glass transition temperature (Tg) of the block copolymer was only reduced by 2° C. compared to the homopolymer, indicating the high thermal property was largely retained.

Morphology of PC Homopolymer and PC—PO Block Copolymer

Figure 4B:
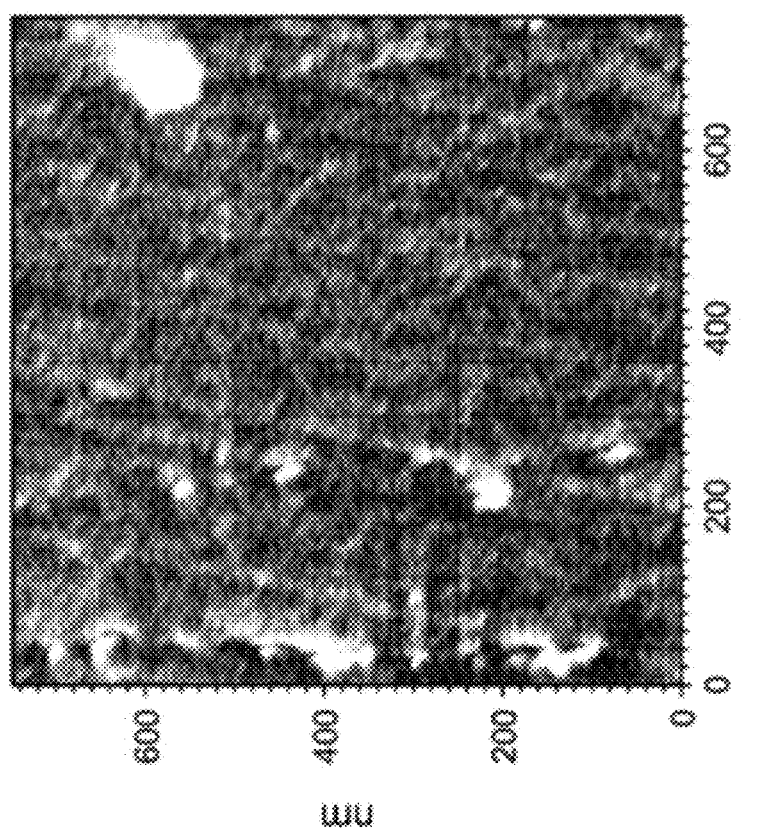
FIG. 4B is an AFM image of a microtome of a polycarbonate-polyolefin block copolymer according to an embodiment of the invention disclosed herein.
Figure 4A:
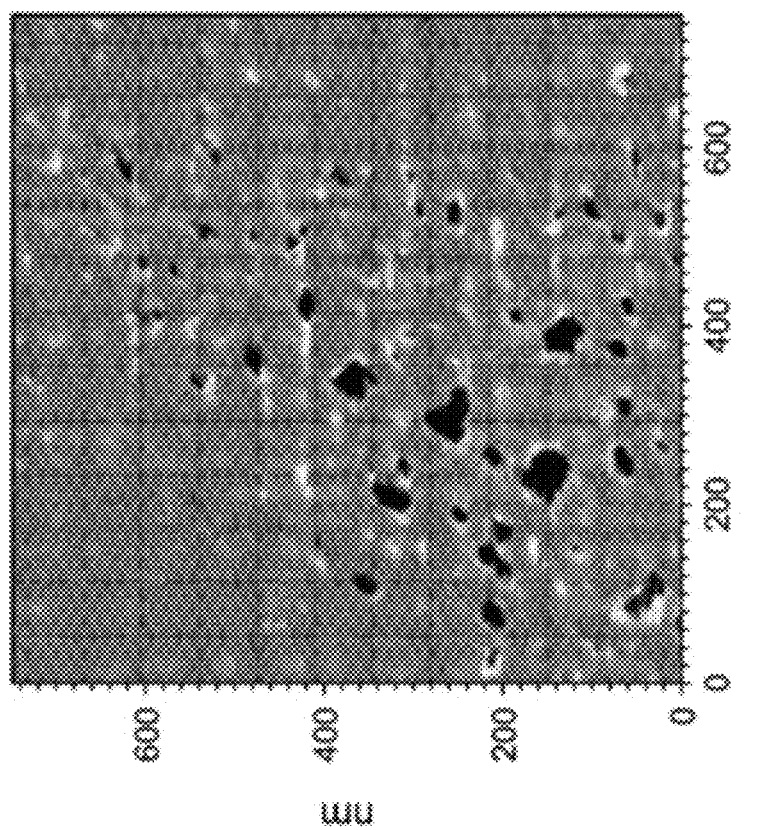
FIG. 4A is an Atomic Force Microscopy (AFM) image of a microtome of a comparative polycarbonate homopolymer.

Samples were cryo-microtomed prior to scanning to create a smooth surface at −120° C. After microtoming, all the samples were purged under nitrogen in a desiccator before AFM evaluation. PC homopolymer (FIG. 4a) shows almost no features in phase—very uniform. Dark areas were simply low spots (holes). PC—PO block copolymer (FIG. 4b) shows small feature sizes in phase, but over a very narrow range of phase angle. There were no clear separate domains readily visible, indicating the formation of dispersed block copolymer and morphological uniformity. The lack of separated domains confirmed the block copolymer formation again and indicated the delamination can be solved.

The phrase "consisting essentially of" in a polymer composition or components in a process means that no other additives, monomers, and/or catalysts are present in the composition or process being referred to other than those named, or, if present, are present to a level no greater than 0.5, or 1.0, or 2.0, or 4.0 wt % by weight of the composition; in a polymer, the phrase "consisting essentially of" means that only the named monomer-derived units are present, and if any others are present, they are present to a level no greater than 0.5, or 0.2 wt % by weight of the polymer; and also in a process, "process . . . consisting essentially of" means that no other major process step is present that effects the formation of covalent chemical bonds between two or more moieties, for example, exposure to external radiation, addition of reactive cross-linking agents, another polymerization step, etc., but minor process features and changes that effect the rate of covalent bond formation as is claimed may be present, such as, for example, a change in temperature or pressure or concentration of components.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

We claim:
1. A process comprising:
polymerizing a di-hydroxyaryl monomer and a di-substituted carbonyl monomer in the presence of a hydroxyaryl-polyolefin moiety to form a polycarbonate-polyolefin block copolymer;
the hydroxyaryl-polyolefin moiety comprising the product from contacting a hydroxyaryl compound with a vinyl and/or vinylidene terminated polyolefin having a number average molecular weight (Mn) of greater than 300 g/mole, and a weight average molecular weight (Mw) of greater than 500 g/mole, to form the hydroxyaryl-polyolefin moiety comprising the polyolefin covalently bonded to the hydroxyaryl compound;
the hydroxyaryl compound having the formula:

wherein x is 1 or 2; and
R' comprises an unsubstituted or substituted aromatic moiety having from 6 to 20 carbon atoms.
2. The process of claim 1, wherein the hydroxyaryl compound comprises an aryl ring according to formula I or II:

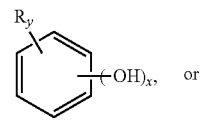

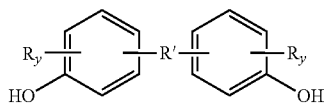

wherein each R is independently hydrogen, or a $C_1$-$C_{20}$ alkyl, aryl, or arylalkyl substituent bonded to the aryl ring in one or more positions;

x is 1 or 2;

y is the number of substituents necessary to render the compound electronically neutral; and wherein R' is a $C_1$-$C_{20}$ divalent alkyl, aryl, or alkylaryl substituent, bound in at least one place to each aryl ring.

3. The process of claim 1, wherein the hydroxyaryl compound is phenol, 1,4-dihydroxybenzene, a $C_1$-$C_{20}$ alkyl substituted-2,2-bis(4-hydroxyphenyl), or a combination thereof.

4. The process of claim 1, further comprising alkylating the hydroxyaryl compound with the vinyl and/or vinylidene terminated polyolefin in the presence of an acid catalyst in an organic solvent at a temperature greater than or equal to about 80° C. to form the hydroxyaryl-polyolefin moiety.

5. The process of claim 1, comprising isolating the hydroxyaryl-polyolefin moiety prior to polymerization of the di-hydroxyaryl monomer and the di-substituted carbonyl monomer.

6. The process of claim 1, wherein the di-substituted carbonyl monomer comprises the formula R"(CO)R", wherein each R" is independently selected from the group consisting of: hydrogen, $C_1$ to $C_{10}$ alkoxy, $C_6$ to $C_{14}$ aryloxy, $C_1$ to $C_{10}$ alkylamino, $C_6$ to $C_{14}$ arylamino, halogen, and combinations thereof.

7. The process of claim 1, wherein the polymerization comprises melt polymerization and/or transesterification in the presence of a polymerization catalyst comprising a lithium halide, lithium hydroxide, lithium aluminum hydride, boron hydride, or a combination thereof.

8. The process of claim 7, wherein the polymerization comprises a plurality of stages, each within a temperature range from about 180° C. to 300° C. for a period greater than or equal 30 minutes.

9. The process of claim 1, wherein the polymerization comprises biphasic polymerization comprising a first phase comprising a salt of the di-hydroxyaryl monomer and a salt of the hydroxyaryl-polyolefin moiety, an amine catalyst, and a second phase comprising phosgene dissolved in an organic solvent.

10. The process of claim 1, wherein the vinyl and/or vinylidene terminated polyolefin has a number average molecular weight of less than 100,000 g/mole.

11. A polycarbonate-polyolefin block copolymer according to formulae (I), (II), or a combination thereof:

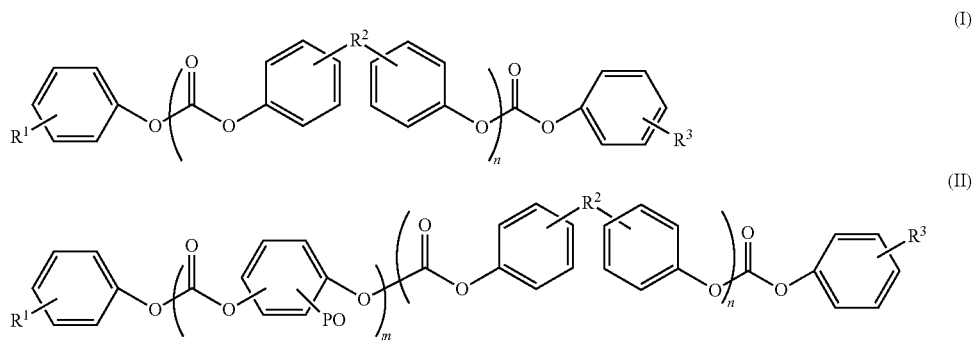

wherein each $R^1$ and $R^3$ is independently hydrogen, $C_1$-$C_{20}$ alkyl, or PO, subject to the proviso that in formula (I) at least one of $R^1$ and $R^3$ is PO;

wherein $R^2$ is a $C_1$-$C_{20}$ divalent alkyl, aryl, or alkylaryl substituent, bound to each aryl ring;

PO is a polyolefin substituent having a number average molecular weight (Mn) of greater than 300 g/mole, covalently bonded to the aryl ring, and a weight average molecular weight (Mw) of greater than 500 g/mole; and m and n are integers independently ranging from 1 to 500.

12. The polycarbonate-polyolefin block copolymer of claim 11, having a branching index (g'vis) of less than 1, determined using gel permeation chromatography.

13. The polycarbonate-polyolefin block copolymer of claim 11, having a glass transition temperature (Tg) within ±10% of a comparative polycarbonate polymer which is essentially identical to the polycarbonate-polyolefin block copolymer except for the presence of the hydroxyaryl-polyolefin moiety.

14. The polycarbonate-polyolefin block copolymer of claim 11 having a complex viscosity (Pa·s) which is less than a complex viscosity of a comparative polycarbonate polymer when determined at a shear rate of 10 rad/sec or higher, wherein the comparative polycarbonate polymer is essentially identical to the polycarbonate-polyolefin block copolymer except for the presence of the hydroxyaryl-polyolefin moiety, or wherein the presence of the hydroxyaryl-polyolefin moiety reduces a complex viscosity (Pa·s) of the block copolymer relative to the polycarbonate.

15. The polycarbonate-polyolefin block copolymer of claim 11, wherein the polyolefin substituent has a number average molecular weight of less than 100,000 g/mole.

16. The polycarbonate-polyolefin block copolymer of claim 11, wherein each polyolefin substituent independently comprises a homopolymer of a $C_2$-$C_{14}$ olefin, a random copolymer of $C_2$-$C_{14}$ olefins, an elastomeric polyolefin of a $C_2$-$C_{14}$ olefin, an impact copolymer of $C_2$-$C_{14}$ olefins, or a block copolymer of $C_2$-$C_{14}$ olefins.

17. The polycarbonate-polyolefin block copolymer of claim 11, wherein each polyolefin substituent independently comprises polyethylene, atactic polypropylene, syndiotactic polypropylene, isotactic polypropylene, ethylene-propylene copolymer, ethylene-butene copolymer, ethylene-hexene copolymer, ethylene-octene copolymer, propylene-butene copolymer, propylene-hexene copolymer, or propylene-octene copolymer.

18. The polycarbonate-polyolefin block copolymer of claim 11, having an essentially monophasic morphological image at a resolution of 200×200 nm determined using atomic force microscopy.

19. The polycarbonate-polyolefin block copolymer of claim 11, having a number average molecular weight (Mn) from about 5,000 g/mole to 60,000 g/mole; a z-average molecular weight (Mz) from about 20,000 to 120,000 g/mole; or a combination thereof.

20. A molded article comprising the polycarbonate-polyolefin block copolymer of claim 11.

* * * * *